I. BERTIN.
VEGETABLE GRATER.
APPLICATION FILED SEPT. 26, 1917.
1,255,379.
Patented Feb. 5, 1918.
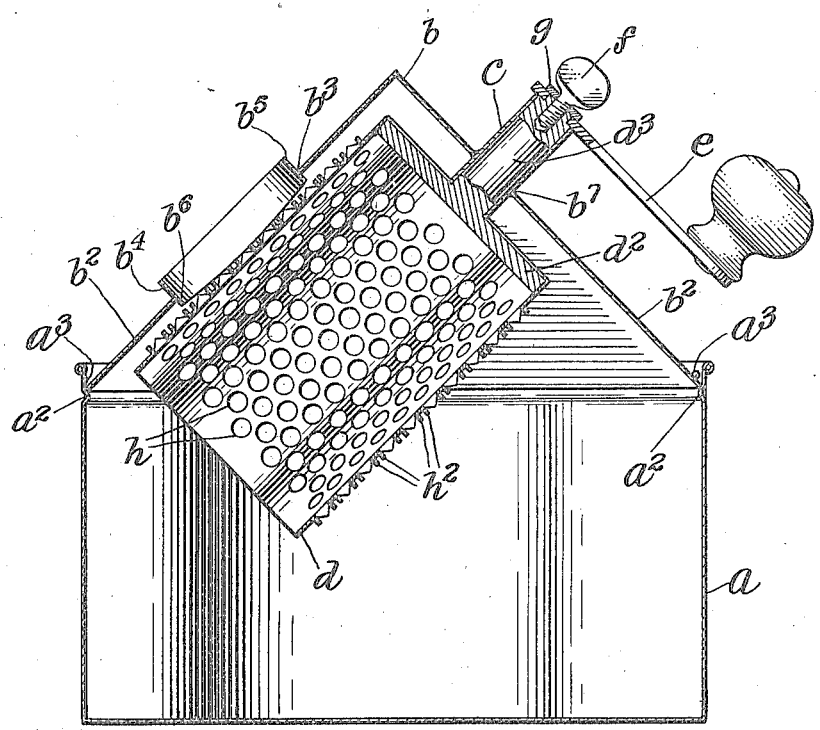
Inventor
Isaac Bertin
By his Attorneys
Edgar Tate & Co.

UNITED STATES PATENT OFFICE.

ISAAC BERTIN, OF NEW YORK, N. Y.

VEGETABLE-GRATER.

1,255,379.         Specification of Letters Patent.         Patented Feb. 5, 1918.

Application filed September 26, 1917.   Serial No. 193,277.

*To all whom it may concern:*

Be it known that I, ISAAC BERTIN, a citizen of the United States, and residing at New York, in the county of New York and State of New York, have invented certain new and useful Improvements in Vegetable-Graters, of which the following is a specification, such as will enable those skilled in the art to which it appertains to make and use the same.

This invention relates to what are known as graters, and particularly vegetable graters, and the object thereof is to provide an improved device of this class primarily designed for use as a horse-radish grater; and with this and other objects in view the invention consists in a grater device of the class specified, constructed and operated, as hereinafter described and claimed.

The invention is fully disclosed in the following specification, of which the accompanying drawing forms a part, said drawing being a vertical transverse section of my improved grater.

In the accompanying drawing the separate parts of my improvement are designated by suitable reference characters and, in the practice of my invention, I provide a container or receptacle $a$ which is preferably composed of sheet metal and cylindrical in form in transverse section and open at the top and preferably provided near the top thereof with an inner annular bead $a^2$. The container $a$ is provided with a conical cover $b$, the form of which is such that opposite side portions $b^2$ thereof are at an angle of 90° to each other and in one of said side portions is an opening $b^3$ in which is secured a band $b^4$ forming, in the construction shown, an outer rim or collar $b^5$, and an inwardly directed flange or rim member $b^6$.

The side $b^2$ of the cover opposite the side in which the opening $b^3$ is formed and in the same plane with the axis of said opening is provided with an opening $b^7$ in which is secured a sleeve $c$. I also provide a cylindrical tubular rotary grater $d$, one end of which is closed by a head $d^2$ provided with a central stem $d^3$ which is passed outwardly through the sleeve $c$, and on which is detachably mounted a crank $e$ which is secured in place by a thumb screw $f$ provided with a washer $g$.

The inner end of the rotary grater $d$ is open and the walls of said grater are provided with numerous apertures $h$ and corresponding outwardly directed teeth $h^2$, and said grater is mounted parallel with the side wall $b^2$ of the cover in which the opening $b^3$ is formed, and in the use of this device the material to be grated is passed inwardly through the opening $b^3$, or through the band $b^4$ secured in said opening with one hand, and the crank $e$ of the grater is turned by the other hand and the material is rapidly grated and the product falls into the rotary grater $d$ and downwardly therethrough into the container $a$ from which it may be removed by detaching the cover $b$.

All of the material grated will not pass into the rotary grater device $b$ but a part thereof will turn with said device and fall into the container $a$, and a part thereof will gather on and adhere to said rotary device $d$, but all of this material may be detached from the rotary grater device $d$ by removing the cover $b$ from the container and detaching the rotary device $d$ therefrom, and in this way said rotary device, as well as the interior of the container and of the cover $b$ may be thoroughly cleaned at all times.

In the construction shown, the bottom of the cover $b$ fits within the top of the container and the cover may be held in position by beads $a^3$ on the inner walls of the top portion of the container, but my invention is not limited to the shape of the bottom portion of the cover $b$ nor the method of connecting said cover with the container, and in the operation of this device, as herein described, the container may be supported on, or connected with a table or other support, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A device of the class described. comprising a container provided with a detachable cover having a side portion provided with an opening and a hollow cylindrical rotary grater detachably mounted in said cover and the axis of which is parallel with said side of the cover, one end of said grater being open and directed downwardly and the other end being provided with a spindle which passes through the cover and is provided with a crank.

2. A device of the class described, comprising a container open at the top and provided with a detachable, conical cover one side portion of said cover being provided with an opening and the opposite side portion with an opening which is provided with a sleeve, and a hollow cylindrical rotary grater mounted in said cover and provided with a stem which passes outwardly through said sleeve and is provided with a crank, the axis of said grater being parallel with the side of the cover having said opening and the lower end of said grater being open.

3. A device of the class described, comprising a container open at the top and provided with a detachable conical cover, one side portion of said cover being provided with an opening in which is secured a collar and the opposite side portion with an opening which is provided with a sleeve, and a hollow cylindrical rotary grater mounted in said cover and provided with a stem which passes outwardly through said sleeve and is provided with a crank, the axis of said grater being parallel with the side of the cover having said first-named opening and the lower end of said grater being open.

In testimony that I claim the foregoing as my invention I have signed my name in presence of the subscribing witnesses this 24th day of September, 1917.

ISAAC BERTIN.

Witnesses:
C. E. MULREANY,
H. E. THOMPSON.

Copies of this patent may be obtained for five cents each, by addressing the "Commissioner of Patents, Washington, D. C."